United States Patent [19]
Inamura

[11] Patent Number: 5,957,463
[45] Date of Patent: Sep. 28, 1999

[54] METAL LAMINATE GASKET WITH IRREGULAR SIZE SEAL RING

[75] Inventor: Susumu Inamura, Utsunomiya, Japan

[73] Assignee: Ishikawa Gasket Co., Ltd., Tokyo, Japan

[21] Appl. No.: 09/025,254

[22] Filed: Feb. 18, 1998

[30] Foreign Application Priority Data

Mar. 14, 1997 [JP] Japan ...................... 9-060467
Mar. 28, 1997 [JP] Japan ...................... 9-077820

[51] Int. Cl.[6] ........................................ F16J 15/08
[52] U.S. Cl. ............................... 277/593; 277/595
[58] Field of Search ................... 277/593, 594, 277/595, 598, 601

[56] References Cited

U.S. PATENT DOCUMENTS

| | | |
|---|---|---|
| 4,721,315 | 1/1988 | Ueta . |
| 4,896,891 | 1/1990 | Udagawa . |
| 5,161,809 | 11/1992 | Matsushita et al. . |
| 5,297,807 | 3/1994 | Udagawa . |
| 5,427,388 | 6/1995 | Ueta . |
| 5,601,292 | 2/1997 | Tanaka et al. . |
| 5,618,049 | 4/1997 | Ueta . |
| 5,628,113 | 5/1997 | Tanaka et al. . |
| 5,863,046 | 1/1999 | Diez et al. . |
| 5,873,577 | 2/1999 | Inamura . |
| 5,876,038 | 3/1999 | Böhm et al. . |

*Primary Examiner*—Anthony Knight
*Assistant Examiner*—John L. Beres
*Attorney, Agent, or Firm*—Kanesaka & Takeuchi

[57] ABSTRACT

A metal laminate gasket of the invention is used for an internal combustion engine. The gasket is formed of first and second metal plates laminated with each other, and a metal ring. The first plate includes a base portion, a curved portion extending from the base portion to define a first opening, a flange extending from the curved portion and located under the base portion, and second openings corresponding to bolt holes of the engine. The second metal plate is situated under the base portion, and includes a third opening greater than the first opening and fourth openings situated under the second openings. The metal ring is situated between the flange and the base portion, and includes narrow portions and wide portions alternately arranged to each other. The wide portions are located close to the bolt holes. Thus, high tightening pressures when bolts disposed in the bolt holes are tightened are supported at the wide portions.

7 Claims, 2 Drawing Sheets

METAL LAMINATE GASKET WITH IRREGULAR SIZE SEAL RING

BACKGROUND OF THE INVENTION AND RELATED ART STATEMENT

The present invention relates to a metal laminate gasket with an irregular size seal ring, in particular a seal ring with narrow and wide portions to securely seal around a hole in an internal combustion engine.

A metal gasket or metal laminate gasket is installed between two engine parts to securely seal around a sealing hole or hole to be sealed. Since high pressure and temperature are formed in or applied to the sealing hole in the engine, there have been proposed many sealing mechanisms.

In the sealing mechanism, generally, a high surface pressure is formed around the sealing hole to securely seal therearound. Especially, since high temperature and pressure are formed in a cylinder bore, bolts are arranged around the cylinder bore to apply high surface pressure around the cylinder bore.

In this case, if high pressure is applied immediately outside the cylinder bore, the cylinder bore may deform due to the high pressure applied from the bolts. Therefore, in the engine, the high pressure should not be simply applied around the cylinder bore.

In one type of the convention gaskets, a first metal plate is turned around a hole to be sealed to form a flange laminating on a base portion of the first metal plate, and a second metal plate is disposed on the base portion without overlapping the flange. In order to increase a surface pressure around the hole, a metal ring may be located between the flange and the base portion.

In this gasket, when the gasket is tightened, portions on the metal ring near the bolts receive high tightening pressures from the bolts, so that large sealing pressures are applied near the bolt holes around the sealing hole. As a result, the tightening pressures in other portions are inevitably reduced. When the tightening pressures around the sealing hole are considered as a whole, the surface pressures are not properly distributed to possibly cause leakage from the sealing hole.

The present invention has been made to obviate the above drawbacks, and an object of the invention is to provide a metal laminate gasket which can securely seal around a hole to be sealed.

Another object of the invention is to provide a metal laminate gasket as stated above, wherein influences by local tightening pressures by bolts are minimized.

A further object of the invention is to provide a metal laminate gasket as stated above, wherein the surface pressure distribution can be easily controlled.

Further objects and advantages of the invention will be apparent from the following description of the invention.

SUMMARY OF THE INVENTION

A metal laminate gasket of the invention is used for an internal combustion engine having a hole to be sealed and bolt holes situated around the hole. The gasket is basically formed of a first metal plate, a second metal plate laminating under the first metal plate and a metal ring.

The first metal plate includes a base portion extending substantially throughout an entire area of the gasket, a curved portion extending from the base portion to define a first opening corresponding to the hole of the engine, a flange extending from the curved portion and located under the base portion, and second openings corresponding to the bolt holes of the engine. The second metal plate is situated under the base portion, and includes a third opening greater than the first opening so that the second metal plate does not overlap the flange when the first and second metal plates are laminated, and fourth openings situated under the second openings.

The metal ring is situated between the flange and the base portion, and includes narrow portions and wide portions alternately arranged to each other. The wide portions are located close to the second and fourth openings corresponding to the bolt holes. Thus, high tightening pressures formed when bolts disposed in the bolt holes are tightened are supported widely at the wide portions. Namely, the high tightening pressures by the bolts are not concentrated at narrow areas, and the area around the hole can be sealed with a desired sealing pressure distribution.

It is possible to provide the surface pressures around the sealing hole substantially equally, or distribute the surface pressure, as required.

If there is no wide portion in the metal ring, the portions close to the bolts receive high tightening pressures, while the portions away from the bolts receive relatively low tightening pressures. As a result, the tightening pressures are not equally or desirably distributed around the sealing hole. Leakage may happen at the portion with the low tightening pressure.

In the invention, the narrow portions have the constant and uniform width, and the wide portions are curved to extend radially outwardly from a center of the metal ring toward the bolt holes. The sizes of the wide portions may be equal in one metal ring, or changed according to the pressure applied thereto. For example, the wide portions may be formed for the bolt holes located at the longitudinal ends of the gasket.

The third opening of the second metal plate has a size greater than the outer diameter of the narrow portions of the metal ring. Thus, the narrow portions of the metal ring are at least disposed in the third opening of the second metal plate.

In this respect, the second metal plate may have depressions extending radially outwardly from a center of the third opening and having shapes corresponding to the wide portions of the metal ring. Accordingly, the metal ring can be completely located in the third opening.

On the other hand, the third opening may have a size less than the outer diameter of the wide portions of the metal ring. In this case, the second metal plate partly overlaps the wide portions. The overlapped portions do not create significant sealing problems in the engine, in case the ring plate is thin and the overlapped portions are located away from the cylinder bore, or dents are formed in the engine parts above or below the overlapped portion.

DETAILED DESCRIPTION OF PREFERRED EMBODIMENTS

Figure 1:
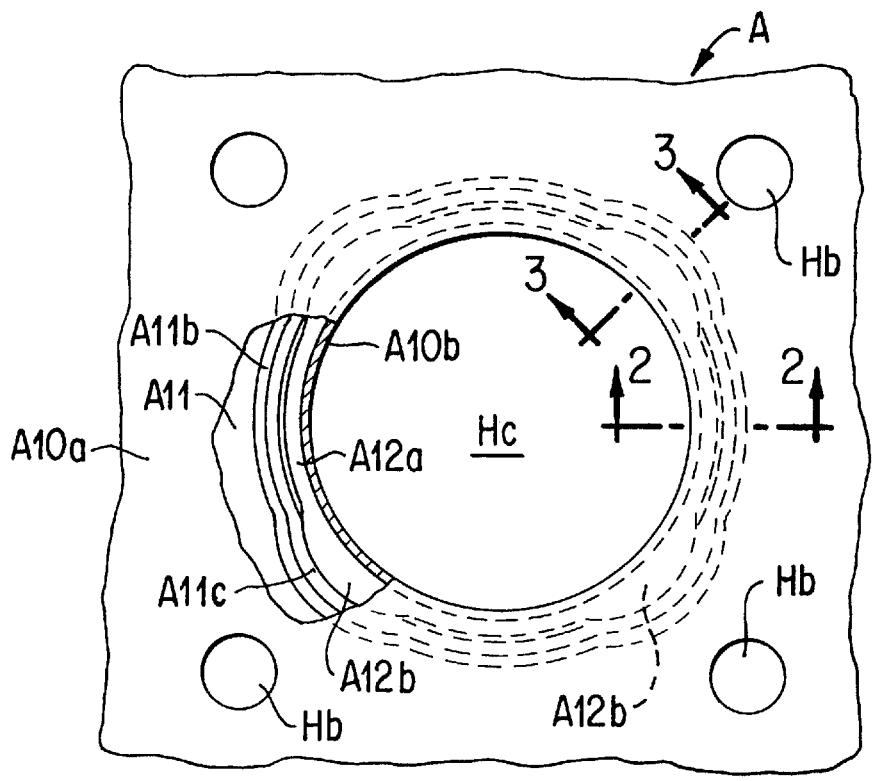
FIG. 1 is a partly cut explanatory plan view of a first embodiment of a metal laminate gasket of the invention.
Figure 2:
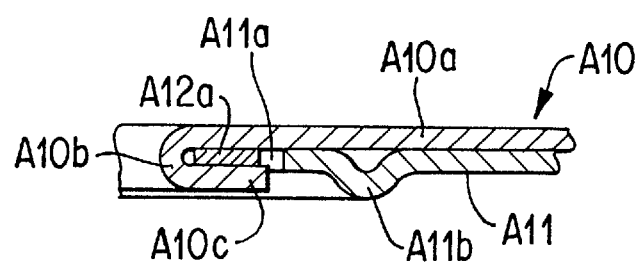
FIG. 2, is an enlarged sectional view taken along line 2—2 in FIG. 1.
Figure 3:
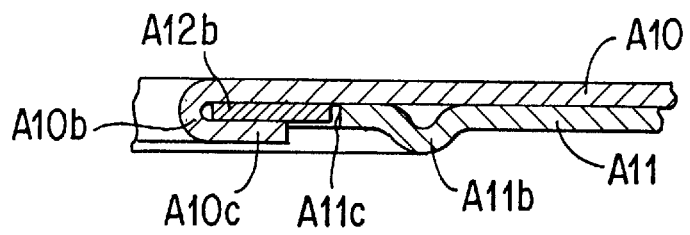
FIG. 3 is an enlarged sectional view taken along line 3—3 in FIG. 1.

With reference to FIGS. 1–3, a first embodiment A of a metal laminate gasket of the invention are explained.

The gasket A is a cylinder head gasket and includes a cylinder bore Hc, bolt holes Hb, water holes, oil holes and so on, as in the conventional gasket. In FIG. 1, however, the water holes and oil holes are omitted.

The gasket A is formed of an upper plate A10, and a lower plate A11. The upper plate A10 includes a base portion A10$a$ extending substantially throughout the entire area of the gasket, a curved portion A10$b$ extending from the base portion A10$a$, and a flange A10$c$ extending from the curved portion A10$b$ and located under the base portion A10$a$. The curved portion A10$b$ define the cylinder bore Hc.

The lower plate A11 is situated under the base portion A10$a$, and has a hole A11$a$ larger than the flange A10$c$ and a bead A11$b$ around the hole A11$a$. The bead A11$b$ extends in the direction away from the upper plate A10. When the upper and lower plates A10, A11 are laminated, the lower plate A11 does not overlap the flange A10$c$.

The lower plate A11 further includes four curved dents A11$c$ extending from a center of the hole A11$a$ toward the bolt holes Hb. The size of the curved dent A11$c$ extending along the periphery of the hole A11$a$ is greater than the diameter of the bolt hole Hb.

The gasket A further includes a ring plate A12 situated between the flange A10$c$ and the base portion A10$a$. The ring plate A12 has generally an annular shape, and is formed of narrow portions A12$a$, and wide portions A12$b$ alternately arranged to each other. The narrow portions A12$a$ are located on the flange A10$c$, but the wide portions A12$b$ extend beyond the flange A10$c$.

When the gasket A is assembled, the ring plate A12 is sandwiched between the flange A10$c$ and the base portion A10$a$. The lower plate A11 is disposed under the base portion of the upper plate A10 such that the wide portions A12$b$ are disposed in the curved dents A11$c$. Accordingly, the wide portions A12$b$ are located close to the bolt holes Hb without overlapping the lower plate A11. The ring plate A12 does not rotate relative to the upper and lower plates A10, A11.

When the gasket A is situated between a cylinder head and a cylinder block (both not shown) and is tightened, the gasket A is compressed. A primary sealing portion formed of the flange A10$c$, the base portion A10$a$ and the ring plate A12 seals around the cylinder bore Hc, and the bead A11$b$ resiliently seals outside the primary sealing portion.

In this case, since the ring plate A12 has the wide portions A12$b$ close to the bolt holes Hb, the tightening pressures applied from the bolts to the ring plate A12 are spread at the wide portions A12$b$, not small areas like the narrow portions. Accordingly, the tightening pressures are widely supported at the ring plate, and are not concentrated at small areas. Therefore, the tightening pressures by the bolts are properly spread or distributed on the ring plate A12 as a whole. Thus, the area around the cylinder bore Hc can be securely sealed.

Incidentally, since the ring plate A12 engages the lower plate A11 at the wide portions 12$b$, the ring plate A12 does not rotate relative to the upper and lower plates A10, A11. Thus, leakage due to rotation of the ring plate A12 is prevented.

Figure 4:
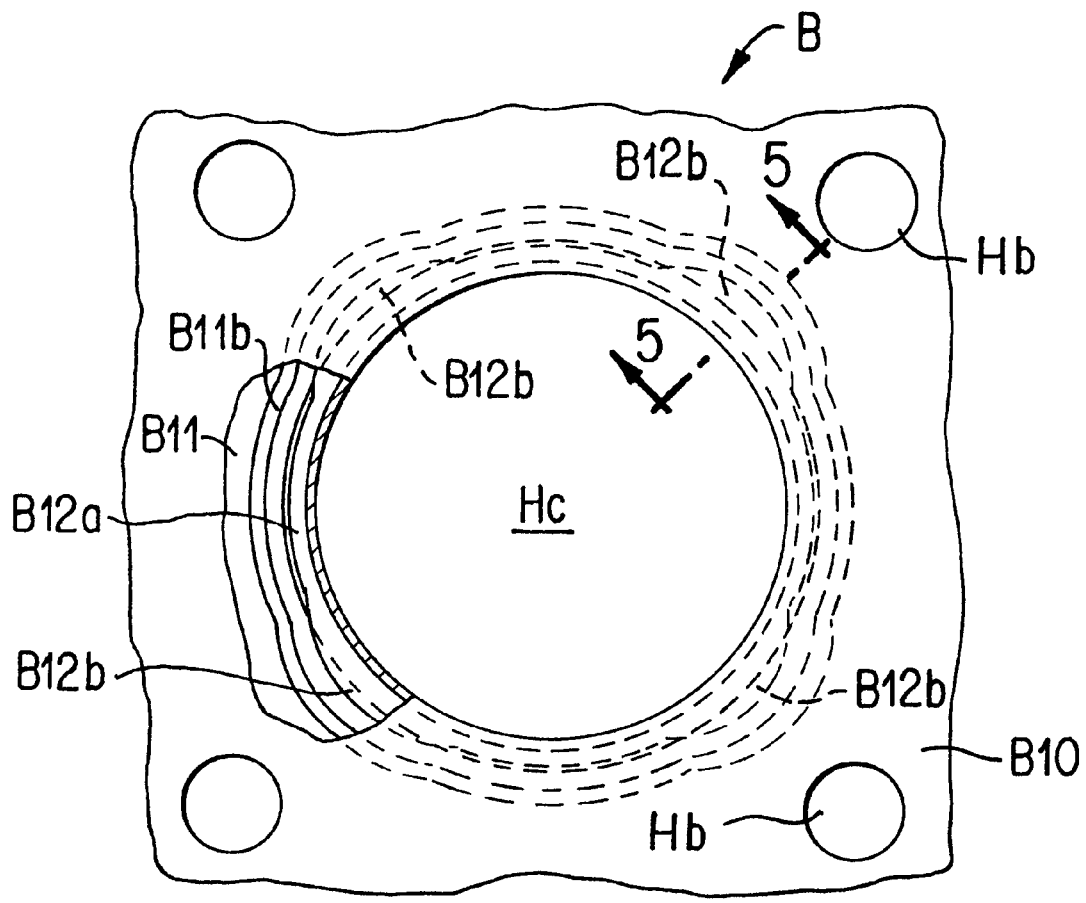
FIG. 4 is a partly cut explanatory plan view of a second embodiment of a metal laminate gasket of the invention.
Figure 5:
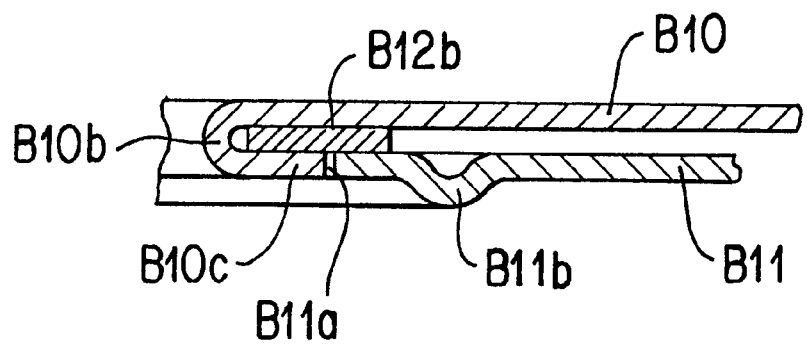
FIG. 5 is an enlarged sectional view taken along line 5—5 in FIG. 4.

FIGS. 4 and 5 show a second embodiment B of a metal laminate gasket of the invention. The gasket B is formed of an upper plate B10 with a curved portion B10$b$ and a flange B10$c$, a lower plate B11 with a bead B11$b$, and a ring plate B12 with narrow and wide portions B12$a$, B12$b$, similar to the gasket A. In the gasket A, the lower plate A11 includes the curved dents A11$c$ near the bolt holes Hb, but in the gasket B, there is no curved dent in the lower plate B11. A hole B11$a$ in the lower plate B11 has a circular shape. Therefore, when the gasket B is assembled, the wide portions B12$b$ of the ring plate B12 are partly laminated or overlapped on the lower plate B11.

When the gasket B is tightened between the cylinder head and the cylinder block, the wide portions B12$b$ are compressed. In this case, the ring plate B12 is made thin and the wide or overlapped portions are located away from the cylinder bore Hc, so that the thickness of the overlapped portions may be neglected. Dents may be formed in the engine parts above or below the overlapped portions to avoid the uneven thickness of the gasket B.

In the gasket B, since the wide portions B12$b$ overlap the lower plate B11, the ring plate B12 does not move or rotate relative to the upper and lower plates B10, B11. The rest of the structure and operation of the gasket B are the same as explained in the gasket A.

In the present invention, the ring plate installed in the gasket has the wide portions near the bolt holes to receive and support the tightening pressures applied from the bolts when the gasket is tightened. Thus, the tightening pressures can be evenly applied onto the ring plate to securely seal around the hole to be sealed. The wide portions need not be formed for all the portions near the bolt holes, and also, the size of the wide portion can be selected as desired based on the surface pressure applied thereto.

While the invention has been explained with reference to the specific embodiments of the invention, the explanation is illustrative and the invention is limited only by the appended claims.

What is claimed is:

1. A metal laminate gasket for an internal combustion engine, said engine having a hole to be sealed and bolt holes situated around the hole, comprising:

a first metal plate including a base portion extending substantially throughout an entire area of the gasket, a curved portion extending from the base portion to define a first opening corresponding to the hole of the engine, a flange extending from the curved portion and located under the base portion, and second openings corresponding to the bolt holes of the engine, a second metal plate situated under the base portion, said second metal plate having a third opening greater than the first opening so that the second metal plate does not overlap the flange, and fourth openings situated under the second openings, a metal ring situated between the flange and the base portion, and having narrow portions and wide portions alternately arranged to each other, said wide portions being located close to the second and fourth openings corresponding to the bolt holes so that high tightening pressures when bolts disposed in the bolt holes are tightened are supported at the wide portions.

2. A metal laminate gasket according to claim 1, wherein each of said narrow portions has a constant and uniform width, and each of said wide portions is curved to extend radially outwardly from a center of the metal ring.

3. A metal laminate gasket according to claim 2, wherein said curved portion has a length between two adjacent narrow portions greater than the diameter of the second and fourth openings.

4. A metal laminate gasket according to claim 1, wherein said third opening has a size greater than an outer diameter of the narrow portions of the metal ring so that the narrow portions of the metal ring are at least disposed in the third opening of the second metal plate.

5. A metal laminate gasket according to claim 4, wherein said second metal plate has depressions extending radially outwardly from a center of the third opening, said depressions having shapes corresponding to the wide portions of the metal ring so that the metal ring is completely located in the third opening.

6. A metal laminate gasket according to claim 4, wherein said third opening has a size less than an outer diameter of the wide portions of the metal ring so that the second metal plate overlaps the wide portions.

7. A metal laminate gasket according to claim 4, wherein said second metal plate includes a bead surrounding the third opening to seal outside the flange.

* * * * *